W. F. ZIMMERMANN.
WORK TABLE FOR METAL WORKING MACHINES.
APPLICATION FILED MAY 5, 1909.
1,029,656.
Patented June 18, 1912.
2 SHEETS—SHEET 1.
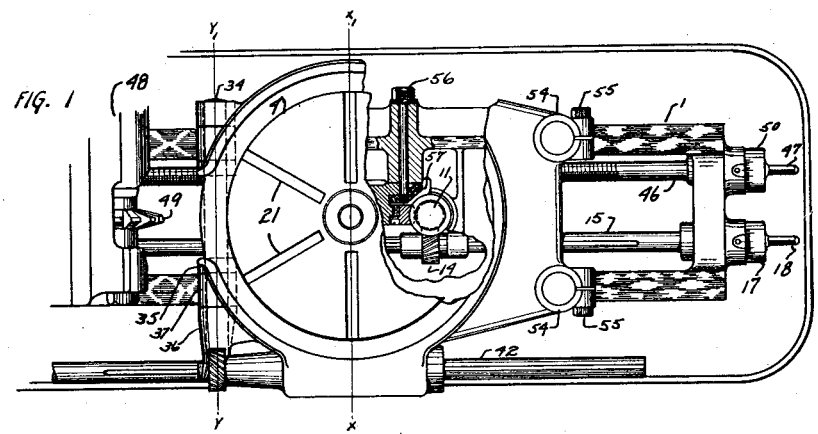
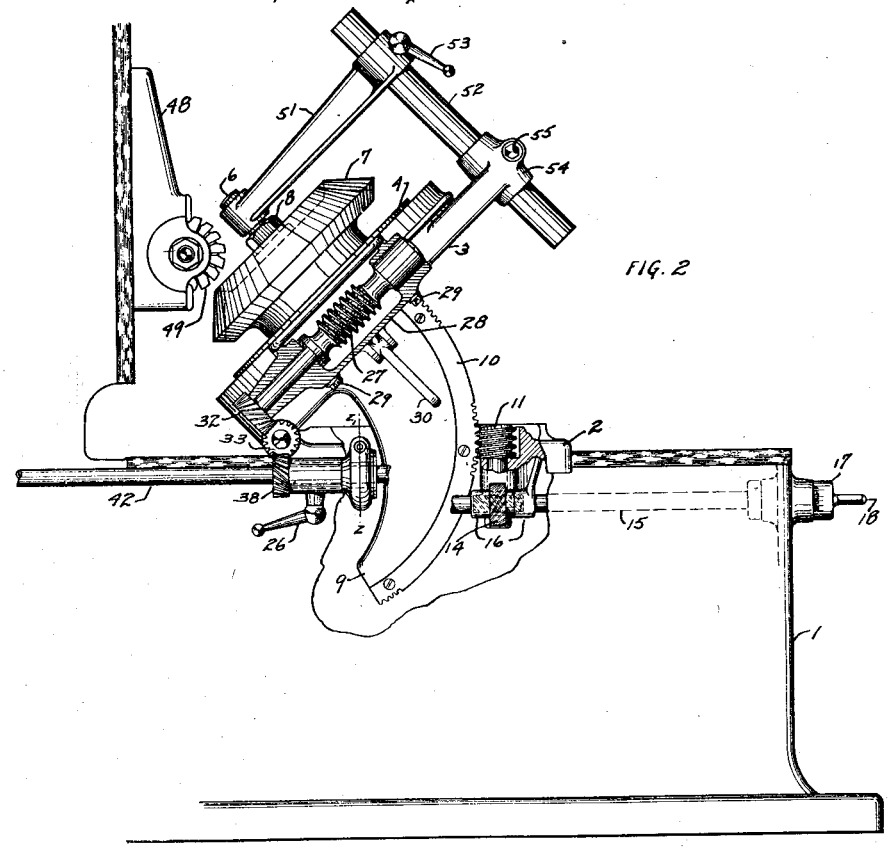
WITNESSES.
B. E. Barnes.
Benjamin Nittinger.
INVENTOR.
William F. Zimmermann.

W. F. ZIMMERMANN.
WORK TABLE FOR METAL WORKING MACHINES.
APPLICATION FILED MAY 5, 1909.
1,029,656.
Patented June 18, 1912.
2 SHEETS—SHEET 2.
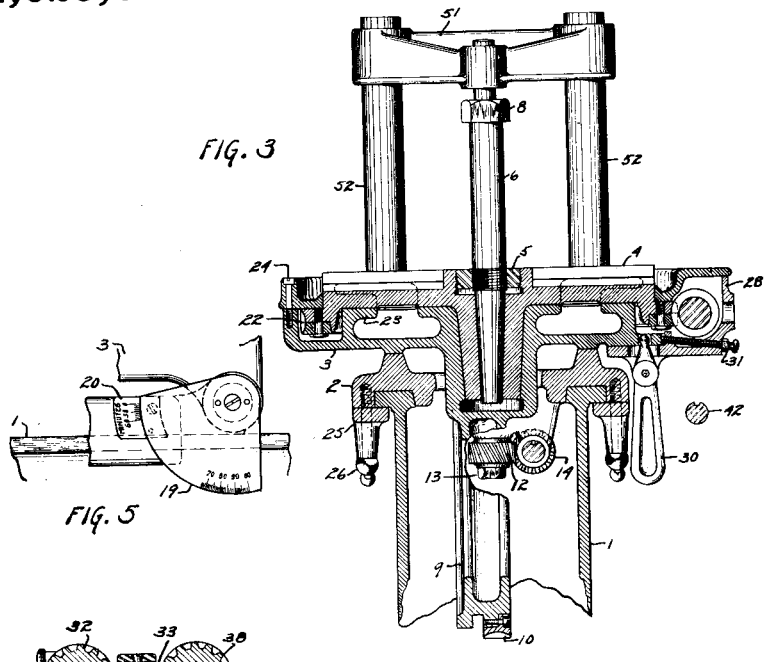
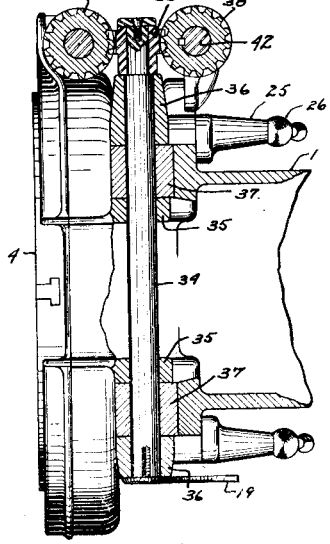
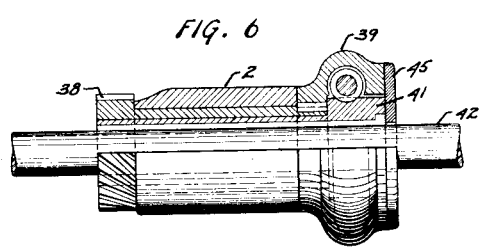
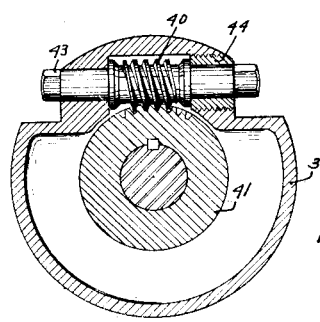
WITNESSES.
B. E. Barnes.
Benjamin Nittinger.
INVENTOR.
William F. Zimmermann

UNITED STATES PATENT OFFICE.

WILLIAM F. ZIMMERMANN, OF NEWARK, NEW JERSEY, ASSIGNOR TO GOULD & EBERHARDT, OF NEWARK, NEW JERSEY, A CORPORATION OF NEW JERSEY.

WORK-TABLE FOR METAL-WORKING MACHINES.

1,029,656.      Specification of Letters Patent.      Patented June 18, 1912.

Application filed May 5, 1909. Serial No. 494,020.

*To all whom it may concern:*

Be it known that I, WILLIAM F. ZIMMERMANN, a citizen of the United States, and a resident of the city of Newark, in the county of Essex and State of New Jersey, have invented certain new and useful Improvements in Work-Tables for Metal-Working Machines; and I do hereby declare the following specification, taken in connection with the drawings forming part of the same, to be a full, clear, and exact description of the principle of said invention and the best mode in which I have contemplated applying that principle, so as to distinguish it from other inventions.

The invention relates primarily to work tables for producing clutches, bevel and crown gears, the table of the present invention being arranged with a hinge at one end thereof to allow for an angular adjustment of the work secured thereon.

The invention can be applied to various types of metal working machines, such as gear cutting, milling, planing and shaping machines, preferably gear cutting machines in which a rotating disk cutter is employed.

The primary object of the present invention is to provide a novel construction of the work table, whereby the bevel gear blanks can be adjusted to various angular positions, thereby eliminating the usual practice in bevel gear cutting machines, of tilting the cutter carriage to the proper angle, the disadvantage of which has always been that such a structure lacked the proper rigidity for heavy cutting more particularly noticeable since the advent of the high speed steel cutters. The lack of rigidity is due to the mounting of the reciprocating cutter carriage upon the angularly adjustable slide and to the circuitous route by which motion is transmitted from the primary mover to the cutter spindle and feed screw.

In the present invention the reciprocating cutter carriage is mounted in the usual simple way as found in spur gear cutting machines; the work table is adjusted to the proper angle and so constructed that the strains imparted thereto by the cutter are transmitted to and taken by a base of rigid construction, upon which said work table is adjustably mounted. This construction eliminates one sliding surface; that is, there are only two sliding surfaces required, namely one for the cutter to reciprocate thereon and one for the work table, whereas in the construction above recited in which the cutter is angularly adjustable, three sliding surfaces are necessary, namely two for the cutter and one for the work table.

Another feature of the angularly adjustable work table is that a less complicated drive is necessary to rotate and feed the cutter. It also eliminates the additional means required to control the reciprocating movements of the cutter slide and the indexing of the blank as found in constructions where the cutter slide is tilted. By adjusting the work table angularly, as set forth in this invention, the index drive is practically the same as usually found in the ordinary spur gear cutting machines, it merely having been necessary to interpose an additional gear therein where the same did not materially affect the accuracy of the divide to any appreciable extent. In bevel gear cutting constructions heretofore, in which the work was adjusted angularly, comparatively small diameter index wheels had to be resorted to near the work, and the index drive was usually of a complicated nature so as to allow of indexing in all the angular positions of the work. In the present invention the indexing mechanism, through which motion is transmitted to index work in all the angular positions, is of simple construction and is provided with a comparatively large index wheel so arranged as to be the last mover and close to the work.

The accuracy and noiseless running qualities of a gear when cut largely depend upon the accuracy, diameter in relation to the work, the proper position in the drive, and the mounting of the index wheel.

The simplicity, rigidity and the adaptability of the present invention to readily convert the simple spur gear cutting machine into a spur and bevel machine is, commercially, a marked advance in the art of cutting bevel gears in which rotating disk cutters are employed.

The invention comprises a work table having an index wheel secured thereto, and rotatably mounted in a tilting bed hinged at one end to an adjustable slide, an index worm adjustably mounted in said bed and arranged to be engaged with, or disengaged from said index wheel, a segmental arm centrally depending from, and preferably integral with said tilting bed, said arm provided with a worm wheel segment upon the outer periphery thereof, a worm to engage with said worm wheel segment, and means to operate said worm whereby said tilting bed is adjusted to any desired angle, an index shaft, gearing between said index shaft and index worm, arranged to rotate said work table when in any desired angular position and to provide for the engaging and disengaging of said index worm wheel in each of said angular positions.

The annexed drawings and the following description set forth in detail, certain mechanism embodying means constituting however, but one of the various mechanical forms in which the principle of the invention may be used.

The novelty of the invention will be readily understood from the drawings, which show so much of a gear cutting machine as to properly illustrate the invention in its preferred form when applied thereto, and from the following description thereof. The novelty is more particularly pointed out in the claims annexed to said description.

Now, referring to the drawings: Figure 1 is a plan view, partly in section to show the work table tilting device more plainly. Fig. 2 is a side elevation of the invention, with the index worm case and frame in part, sectioned to illustrate the interior. Fig. 3 is a section at X X, of Fig. 1 through the work table and tilting bed when adjusted to their lowest position, as when cutting spur gears. Fig. 4 is a section at Y Y, of Fig. 1 through the hinge joint. Fig. 5 is a side elevation of the vernier which indicates the angular position of the tilting bed. Fig. 6 is a quarter sectional view of the index worm wheel micrometer adjusting device. Fig. 7 is a sectional view of the same at Z Z, of Fig. 2.

Referring now particularly to Figs. 2 and 3, mounted upon the main frame 1, is an adjustable slide 2 provided with clamps 25, which are operated by the handles 26, whereby the slide 2 can be firmly secured to the main frame 1. Hinged to one end of said adjustable slide 2, is a tilting bed 3 having rotatably mounted therein, a work table 4. A work arbor 6 is secured in said work table 4 by means of a differential nut 5, and centers the bevel gear blank 7 and has a threaded portion upon one end thereof, about which the nut 8 is adjusted to secure the bevel gear blank 7 rigidly to the work table 4. Depending from the center of the tilting bed 3 and preferably integral therewith, is a segmental arm 9, to the periphery of which a worm wheel segment 10 is attached by means of screws. Said worm wheel segment 10 is preferably made separate from the segmental arm 9, to facilitate the manufacturing thereof. The segmental arm 9 passes through an aperture in the slide 2 and is secured thereto by means of a bolt 56 and clamp 57 arranged to rigidly clamp the outer periphery of said segmental arm 9 to a finished portion provided within the aperture of said slide 2.

An adjusting worm 11 is rotatably mounted in a suitable bearing of the adjustable slide 2 and is arranged to engage with the worm wheel segment 10, whereby the tilting bed 3 and the bevel gear blank 7 are adjusted to the proper angular position preparatory to the cutting of the teeth. The adjusting worm 11, has secured to one end thereof, a helical gear 12 which is held in position by means of a nut 13 and engages with a helical gear 14 at right angles thereto. Said gear 14 is slidably keyed upon the splined segment adjusting shaft 15, rotating therewith and is held between the bearings 16 in the slide 2. The segment adjusting shaft 15 is provided with suitable bearings at either end of the main frame 1, the forward end thereof projecting beyond the frame and provided with a graduated dial 17 and a square end 18 to receive a crank handle. The ratio of the worm wheel segment 10 and worm wheel 11, and helical gears 13 and 14 is such, that for each turn of the segment adjusting shaft 15, the tilting bed 3 is adjusted one degree which is indicated by the dial 17 graduated to read in minutes.

Referring to Fig. 5 there is shown a graduated segment 19 reading in degrees and secured to the tilting bed 3 in connection with a vernier scale 20 reading in tenths of a degree, to indicate the exact angular position of the work at all times.

Referring now particularly to Fig. 3 the work table 4 is rotatably mounted in the tilting bed 3 and provided with T slots 21, whereby the work can be secured thereto and rotated thereby. The index wheel 22 which rotates the work, is arranged upon the periphery of the work table 4 and is made preferably integral therewith and of the split type for accuracy. The work table 4 is supported near the outer periphery by a circular bearing 23 arranged in the tilting bed 3, and is held thereto by the circular plate 24 secured to the tilting bed 3 by means of the screws shown in Fig. 3. The circular plate 24 is provided on the upper face thereof, with a circular groove, open at the end nearest the upright portion of the main frame to form a channel for the cuttings and the lubricant so as to lead them into the base of the main frame. The plate 24 also serves as a guard to protect the index wheel 22 from the chips and dust.

The index wheel 22 is rotated by an index worm 27 rotatably mounted in an adjustable bearing 28 arranged upon the tilting bed 3 and secured thereto by means of the bolts 29. The worm bearing 28, which is provided with elongated slots for the bolts 29, is adjusted toward or away from the index wheel 22 by means of the handle 30 pivoted in said bearing 28 and fulcrumed in the tilting bed 3. A stop screw 31 is provided in said bearing 28 to gage the depth of engagement of said worm 27 and wheel 22. To one end of the index worm 27 is secured a helical gear 32 engaging with a second helical gear 33 mounted at right angles thereto. Said gear 33 is loosely mounted upon the hinge shaft 34 passing through the projecting lugs 35 and 36, which are integral with the tilting bed 3, and the lug 37, interposed between said lugs 35 and 36 which is integral with the adjustable slide 2 and supported by the ways of the main frame 1. The helical gear 33 engages with and is rotated by a helical gear 38, rotatably mounted in a bearing of the slide 2. This arrangement of helical gears provides for a rotary motion being transmitted from the helical gear 38 to the index worm 27, independent of the angular position of said worm 27. The arrangement also provides for the disengaging of the index worm 27 from the wheel 22 in all the angular positions of said worm 27. The worm 27 is preferably mounted parallel with the length of the main frame 1 because of the structural advantage but could also be mounted parallel with the hinge shaft, without departing from the spirit of the invention.

The helical gear 38 which is rotatably mounted in the slide 2 (see Figs. 6 and 7) is provided with a long hub, to the end of which is keyed a case 39. An adjusting worm 40 is rotatably mounted in said case 39 and engages with worm wheel 41, slidably keyed to the splined indexing shaft 42, extending alongside of the main frame 1. The worm 40 is provided with hexagonal ends 43, to fit a key wrench by means of which the helical gear 38 can be adjusted, and thereby the index wheel 22, without altering the rotative position of indexing shaft 42. The adjusting worm 40 is provided with a screw bearing 44 to compensate for end wear. The worm 41 is arranged with a long hub about which the hub of the helical gear 38 rotates. A cap is provided to hold the worm wheel 41 in position.

The indexing worm wheel adjusting device described, provides a positive but still adjustable connection between the index driving shaft and the index worm wheel.

When the work has been adjusted to the proper angle as hereinbefore described, the slide 2 is adjusted longitudinally by means of the screw 46 provided with a square end 47 to receive a crank handle toward the upright portion of the main frame 1, upon which the cutter carriage 48 is mounted to reciprocate vertically and which carries the cutter 49. The amount of adjustment is indicated by the dial 50 graduated to read in thousandths of an inch. After the work is secured to the mandrel 6 by means of the nut 8, the projecting end of said mandrel 6 is supported by a triangular arm 51, slidably arranged upon two posts or uprights 52 and clamped thereto by means of the handles 53. The posts 52 are slidably mounted in the bearings 54, provided in the tilting bed 3 and are clamped to said bed 3 by means of the bolts 55.

The means to reciprocate the cutter carriage 48 and to rotate the cutter 49 are not shown, since they add nothing material to the present invention, and for the same reason the spacing mechanism, to index the work, has not been illustrated. It might be stated, however, that the well known means, as found in the ordinary type of spur gear cutting machines, can be readily applied to reciprocate and rotate the cutter and perform the spacing in connection with the present invention, the spacing mechanism being connected to the index shaft 42.

Having described my invention I claim as new and desire to secure by Letters Patent—

1. The combination with a slide of an angularly adjustable bed attached thereto, a work table rotatably mounted in said bed, an index wheel connected thereto, an index shaft connected to said index wheel, said index wheel and shaft carried by said bed, and means to angularly adjust and support said work table, index wheel and shaft at any desired angular position.

2. The combination with a slide, of an angularly adjustable bed attached thereto, a work table rotatably mounted in said bed, an index wheel connected thereto, an index shaft connected to said wheel, means to angularly adjust said work table, index wheel and index shaft to any desired angular position, a drive shaft and gearing between said index and drive shafts forming a pivotal connection to transmit motion from said drive shaft to said work table.

3. The combination with an adjustable slide, of an angularly adjustable bed attached thereto, a work table rotatably mounted in said bed, an index wheel connected thereto, an index shaft connected to said wheel, said index wheel and shaft carried by said bed, means to angularly adjust said work table, index wheel and index shaft to any angular position, a drive shaft mounted parallel with the movement of said slide, and gearing carried by said slide connecting said drive and index shafts.

4. The combination with a slide, of an angularly adjustable bed attached thereto, a work-table rotatably mounted in said bed, a worm wheel secured thereto, a worm meshing with said worm wheel, said worm wheel and worm carried by said bed, means to angularly adjust and support said work table, worm wheel and worm to any angular position, a drive shaft, and gear connections between said worm and drive shaft.

5. The combination with a slide, of a tilting bed hinged thereto, a hinge shaft therefor, means to angularly adjust said bed, a work table rotatably mounted in said tilting bed, a worm wheel secured thereto, a worm engaging said wheel, mounted in a different plane from and at right angles to said hinge shaft, a drive shaft, and gearing between said worm and drive shaft to rotate said work table when in any angular position.

6. The combination with a slide of a tilting bed hinged thereto, a hinge shaft therefor, means to angularly adjust said bed, a work table rotatably mounted in said bed, an index wheel secured thereto, an index shaft connected with said index wheel arranged to swing about said hinge shaft as a center, a drive shaft, and gearing to connect said index and drive shafts, whereby motion is transmitted from said drive shaft to said work table when in any angular position.

7. The combination with a slide of a tilting bed hinged thereto, a hinge shaft therefor, means to angularly adjust said bed, a work table rotatably mounted in said bed, an index wheel secured thereto, an index shaft connected to said wheel mounted in a different plane from and at right angles to said hinge shaft and arranged to swing about said hinge shaft as a center, a drive shaft, and gearing to connect said index and drive shafts, whereby motion is transmitted from said drive shaft to said work-table when in any angular position.

8. The combination with a slide, of a bed hinged thereto and adjustable to and from said slide, a hinge shaft, a work table rotatably mounted in said bed, an index wheel secured thereto, an index shaft connected to said wheel mounted in a different plane from and at right angles to said hinge shaft, a drive shaft arranged in the same vertical plane with said index shaft and gearing between said index and drive shafts.

9. The combination with a slide, of a tilting bed hinged thereto, a hinge shaft therefor, means to angularly adjust said bed, a work table rotatably mounted in said bed, an index wheel secured thereto, an index shaft connected with said index wheel mounted in said bed in a different plane from and at right angles to said hinge shaft, a drive shaft, gearing to connect said index and drive shafts, and means to disengage said index shaft from said wheel when in any angular position.

10. The combination with a slide, of an angularly adjustable bed attached thereto, a work table rotatably mounted in said bed, an index wheel connected thereto, an index shaft connected to and adjustable toward and from said wheel, said index wheel and shaft carried by said bed, means to angularly adjust said bed, index wheel and index shaft to any desired angular position, a drive shaft, and gearing between said index and drive shafts to form a driving connection whereby said index shaft is rotated when in any angular position and adjusted toward or from said index wheel without the removal of said gear connections.

11. The combination with a slide of a tilting bed hinged thereto and adjustable to and from said bed, a work table rotatably mounted in said tilting bed, and index wheel connected thereto, an index shaft connected to said wheel, said wheel and shaft carried by said bed, means to angularly adjust and support said work table, index wheel and shaft and means to disconnect said index shaft from said wheel when in any regular position.

12. The combination with a slide, of a tilting bed hinged thereto and adjustable to and from said slide, a work table rotatably mounted in said tilting bed, an index wheel connected thereto, a gear meshing with said index wheel, said wheel and gear carried by said bed, means to angularly adjust and support said work table, index wheel and gear, an index drive shaft, gearing connecting said gear and index drive shaft, and means to disengage said gear from said index wheel when in any angular position without removing any of said gear connections.

13. The combination with a slide, of a tilting bed hinged thereto, means to angularly adjust said bed, a work table rotatably mounted in said bed, a worm wheel secured thereto, a worm engaging said wheel and carried by said bed, a drive shaft, gear connections between said drive shaft and worm, whereby said work table is rotated when in any angular position, and means comprising an adjustable bearing for said worm, arranged on said bed, whereby said worm can be disconnected from engagement with said wheel without removing any of said gear connections.

14. The combination with a slide, of a bed hinged thereto and adjustable to and from said slide, a hinge shaft, a work table rotatably mounted in said bed, an index wheel secured thereto, an index shaft connected to said wheel, a drive shaft, gearing between said index and drive shafts, comprising a gear secured to said index shaft, a second gear loosely mounted on said hinge shaft and engaging with said first gear, and a third gear secured to said drive shaft and engaging with said second gear, whereby motion is transmitted from said index shaft to said work table when in any angular position.

15. The combination with a slide, of a bed hinged thereto and adjustable to and from said slide, a hinge shaft, a work table rotatably mounted in said bed, an index wheel secured thereto, an index shaft connected to said wheel mounted in a different plane from and at right angles to said hinge shaft, a drive shaft, and gearing between said index and drive shafts comprising a helical gear secured to said index shaft, a second helical gear loosely mounted on said hinge shaft and engaging with said first gear, a third helical gear secured to said drive shaft and engaging with said second helical gear, whereby motion is transmitted from said drive shaft to said work table when in any angular position.

16. The combination with a reciprocating cutter carriage, of a work slide, means to relatively adjust said cutter carriage and work slide toward and from each other, an angularly adjustable bed attached to said work slide, a work table rotatably mounted in said adjustable bed, an index wheel connected thereto, an index shaft connected to said wheel, and means to angularly adjust and support said bed, index wheel and index shaft at any desired angular position.

17. The combination with a reciprocating cutter carriage, of a work slide, means to relatively adjust said cutter carriage and work slide toward and from each other, a bed hinged to, and adjustable to and from said work slide, a work table rotatably mounted in said bed, an index wheel connected thereto, an index shaft connected to said index wheel, means to angularly adjust and support said bed, index wheel and index shaft at any desired angular position, an index drive shaft and gearing connecting said index and index drive shafts to rotate said work table when adjusted to any desired angular position.

18. The combination with a slide, of a tilting bed hinged to one end thereof, a segmental arm centrally depending from said tilting bed and passing through an opening in said slide, means mounted in said slide to adjust said tilting bed to any desired angular position and to clamp said tilting bed to said slide when so adjusted, a work table rotatably mounted in said tilting bed, an index wheel connected thereto, an index shaft connected to said index wheel, a drive shaft and gearing between said index and drive shafts to permit rotation of said work table when in any angular position.

19. The combination with a slide, of a tilting bed hinged at one end thereof, a work table rotatably mounted in said tilting bed, a segmental arm depending from said tilting bed and provided with worm teeth upon the outer periphery thereof, means mounted in said slide to adjust said tilting bed to any desired angular position, comprising a worm engaging said segmental arm, a helical gear secured thereto, a second helical gear arranged between two bearings in said slide and engaging with said first gear, and an adjusting shaft having said second helical gear splined thereto and rotatable therewith, and arranged in bearings provided in the main frame.

20. The combination with a slide, of a tilting bed hinged at one end thereof, a segmental arm depending from said tilting bed with means to adjust same to any desired angular position, a work table rotatably mounted in said tilting bed, an index wheel connected therewith, an index shaft connected to said wheel to rotate same, a work mandrel secured to said work table and rotatable therewith, a triangular support therefor, two uprights adjustably mounted in said tilting bed and having said triangular support adjustable thereon and means to clamp said support to said uprights and said uprights to said tilting bed.

21. The combination with a slide of a tilting bed hinged to one end thereof, a segmental arm depending from said tilting bed with means to adjust same to any desired angular position, means to clamp said segmental arm, and thereby said tilting bed, to said slide, a work table rotatably mounted in said tilting bed, an index wheel connected thereto, a worm engaging said index wheel, an index shaft, gearing between said worm and drive shaft to permit rotation of said work table when in any angular position.

WILLIAM F. ZIMMERMANN.

Witnesses:
EDWIN C. THURSTON,
BENJAMIN NITTINGER.